(12) United States Patent
Ramachandran et al.

(10) Patent No.: US 10,409,014 B1
(45) Date of Patent: Sep. 10, 2019

(54) PIC DIE PACKAGING USING MAGNETICS TO POSITION OPTICAL ELEMENT

(71) Applicant: GLOBALFOUNDRIES INC., Grand Cayman (KY)

(72) Inventors: Koushik Ramachandran, Wappingers Falls, NY (US); Benjamin V. Fasano, New Windsor, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/031,176

(22) Filed: Jul. 10, 2018

(51) Int. Cl.
*G02B 6/42* (2006.01)

(52) U.S. Cl.
CPC ............ *G02B 6/4243* (2013.01); *G02B 6/423* (2013.01); *G02B 6/4239* (2013.01); *G02B 6/4249* (2013.01)

(58) Field of Classification Search
CPC .................................................... G02B 6/4243
See application file for complete search history.

(56) References Cited

U.S. PATENT DOCUMENTS

| | | | | |
|---|---|---|---|---|
| 4,930,854 A | * | 6/1990 | Albares | G02B 6/30 385/49 |
| 5,276,762 A | * | 1/1994 | Hartman | G02B 6/30 385/135 |
| 5,926,594 A | | 7/1999 | Song et al. | |
| 9,568,682 B1 | | 2/2017 | Barwicz et al. | |
| 2003/0174419 A1 | | 9/2003 | Kindler et al. | |

FOREIGN PATENT DOCUMENTS

JP   56077814 A  *  6/1981  ........... G02B 6/3839

* cited by examiner

*Primary Examiner* — Omar R Rojas
(74) *Attorney, Agent, or Firm* — David Cain; Hoffman Warnick LLC

(57) ABSTRACT

A photonic integrated circuit (PIC) package includes a PIC die including electro-optical circuitry having an optical waveguide system therein and a V-groove fiber optic receptacle on a first surface thereof. The V-groove fiber optic receptacle positions an optical element, e.g., optical fiber(s), for optical coupling with the optical waveguide system. An optical element is operatively coupled to the optical waveguide system and positioned in the V-groove fiber optic receptacle. A magnetic force inducer (MFI) is positioned to forcibly direct the optical element into position in the V-groove fiber optic receptacle in response to application of a magnetic field from a direction opposite the V-groove fiber optic receptacle in the first surface. During assembly, a magnetic field may be applied to the MFI to generate the magnetic force. After adhering the optical element, the magnetic field may remain to allow the PIC package to be moved with more security. The MFI may remain with and become part of the finished assembly.

15 Claims, 5 Drawing Sheets

PIC DIE PACKAGING USING MAGNETICS TO POSITION OPTICAL ELEMENT

BACKGROUND

The present disclosure relates to photonic integrated circuit (PIC) die packaging, and more specifically, to PIC die packaging using magnetics to position an optical element such as optical fibers.

Current photonic packages consisting of V-groove photonic integrated circuit (PIC) dies require complex packaging integration schemes. In particular, optical elements such as optical fibers or optical fiber arrays are optically coupled to the PIC die and internal waveguides thereof. Conventionally, V-groove fiber optic receptacles in a surface of the PIC die provide an alignment and retention feature for passive alignment of an optical fiber to couple light from an end surface (typically, 125 micrometers (um) fiber outer diameter with a 9 um fiber core) thereof to an exposed end of an optical waveguide (approximately 200×450 nanometers (nm)) in the PIC die. In this process, optical fibers are positioned by a pick-and-place tool into respective V-groove fiber optic receptacles in a surface of the PIC die. V-groove fiber optic receptacles enable two linear contact regions for each optical fiber to align the optical fiber core to a silicon waveguide in the PIC die. The two linear contact regions ensure passive optical alignment when the optical fiber(s) is fully seated on the V-groove sidewalls, with an optical fiber end to waveguide end separation of perhaps +/−5 um. Once in position, the optical fibers are secured in place using a refractive index (RI) matching optical adhesive, which is ultraviolet (UV) cured to tack the adhesive, often prior to full curing using a thermal cure process.

One challenge in achieving high alignment accuracy is applying a uniform force along the optical fiber surface near the coupling site to ensure the optical fiber to V-groove contact and prevent optical fibers from lifting up at the coupling interface, i.e., to maintain position and pitch alignment. To address this situation, glass lids have been used to force the optical fibers into the V-groove fiber optic receptacles. In this arrangement, the glass lids are placed over the optical fiber(s) and pressed down to force the optical fiber(s) into place. More specifically, the pick-and-place tool tip is used to position and then apply a downward force to the glass lids. This situation is not ideal because the pick-and-place tool tips are typically not designed to apply force during adhesive cure, and the process is not readily repeatable.

Another challenge is achieving optimal UV radiation cure of the adhesive to tack the fibers in place. In particular, the glass lids are transparent to allow UV radiation to pass therethrough to adequately cure the UV curable adhesive. However, during the time that the pick-and-place tool tip is applying a force on the lid, it blocks UV radiation from curing the adhesive and/or causes shadowing effects, inhibiting cure. The result is that the UV curable adhesive does not cure in certain locations, or the PIC die must remain for a longer time than desired in the optical fiber assembly tool. UV transparent pick-and-place tool tips have been proposed, but they present concerns with adhesive contamination of the tip. UV transparent polymer or glass fiber blocks on which arrays of optical fibers are pre-attached have been employed, but they also must be picked and placed into position and mechanically forced down to position the optical fibers. Consequently, they present many of the same challenges already described.

SUMMARY

A first aspect of the disclosure is directed to a photonic integrated circuit (PIC) package, comprising: a PIC die, the PIC die including electro-optical circuitry having an optical waveguide system therein and a V-groove fiber optic receptacle on a first surface thereof; an optical element operatively coupled to the optical waveguide system and positioned in the V-groove fiber optic receptacle; and a magnetic force inducer (MFI) positioned over the optical element A second aspect of the disclosure includes a photonic integrated circuit (PIC) package, comprising: a PIC die mounted to a first surface of a PIC die carrier, the PIC die including electro-optical circuitry having an optical waveguide system therein and a plurality of V-groove fiber optic receptacles on a first surface thereof; a plurality of optical fibers, each optical fiber positioned in one of the plurality of V-groove fiber optic receptacles; a magnetic force inducer (MFI) positioned on at least one of the plurality of optical fibers to forcibly direct at least one of the plurality of optical fibers into position in a respective V-groove fiber optic receptacle in response to application of a magnetic field from a direction opposite the V-groove fiber optic receptacles in the first surface; and a sub-carrier member coupled to a second surface of the PIC die carrier opposite the first surface thereof, the sub-carrier member including a magnetic field generator configured to create the magnetic field that creates the magnetic force on the MFI against the at least one of the plurality of optical fibers.

A third aspect of the disclosure related to a method, comprising: placing an optical element in a V-groove fiber optic receptacle of a photonic integrated circuit (PIC) die, the V-groove fiber optic receptacle configured to receive and operatively position the optical element for optical coupling to the PIC die; placing a magnetic force inducer (MFI) over the optical element; generating a magnetic field, the magnetic field creating a magnetic force on the MFI, forcing the optical element into position in the V-groove fiber optic receptacle; and adhering the optical element to the V-groove fiber optical receptacle using an adhesive.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

A method according to embodiments of the disclosure employs a magnetic force inducer (MFI) over an optical element that when exposed to a magnetic field, forces the optical element into position in a V-groove fiber optic receptacle in a surface of the PIC die. The optical element can be tacked in place using an ultraviolet (UV) curable adhesive without having to force the optical element in place with a pick-and-place tool tip during the UV cure process as the force is applied across the optical element using the MFI. Consequently, the UV adhesive is readily cured because no tool is blocking the UV radiation. Further, there is no chance of pick-and-place tool damage or contamination. In one embodiment, the MFI may remain in the PIC package.

Figure 1:
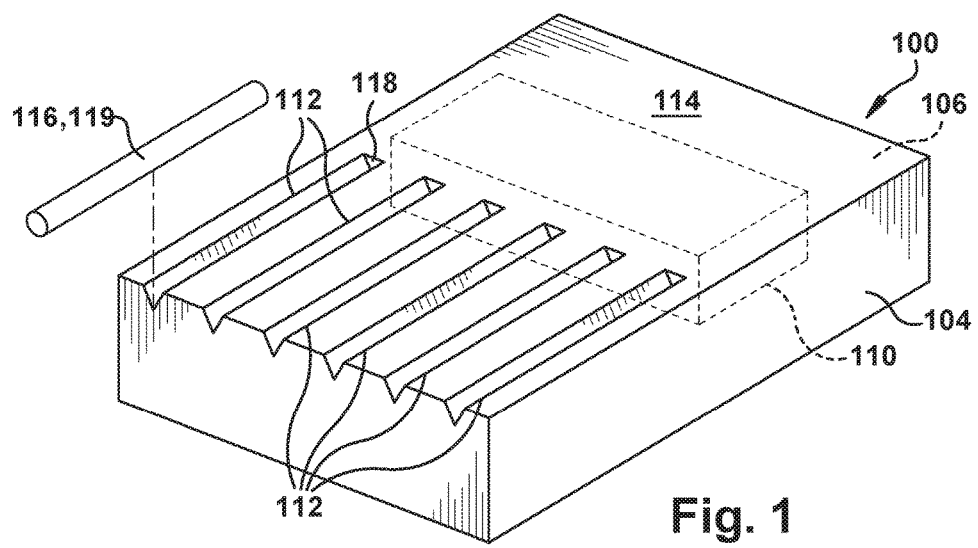
FIG. 1 shows a perspective view of a PIC die, according to embodiments of the disclosure.
Figure 2:
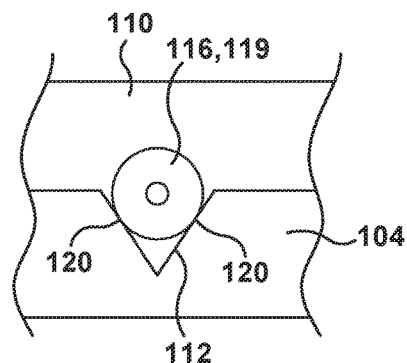
FIG. 2 shows an enlarged cross-sectional view of an optical element in the PIC die of FIG. 1.

Referring to FIGS. 1-14, various views of a method according to embodiments of the disclosure is illustrated. FIG. 1 shows a perspective view of a PIC die 100 for a PIC package 102 (FIGS. 10, 14 and 15) that may include a PIC die or die body 104. PIC die 104 may include any now known or later developed semiconductor photonic integrated circuit. As understood in the art, PIC die 104, also known as integrated optical circuits, can be any device that includes electro-optical circuitry 106 that integrates multiple photonic functions for optical information signals received thereby via, e.g., an optical element including optical fibers. Such functions oftentimes include converting the optical information signals to electrical signals or vice versa. Electro-optical circuitry 106 may include an optical waveguide system 110 (e.g., grating coupler or I/O waveguide), but may also include, depending on application, other components such as but not limited to: a Bragg reflector, an arrayed waveguide grating or other wave guide, transistor based electronics including detectors and modulators, amplifiers, and/or an externally modulated laser diode with an electro-absorption modulator. It is understood that optical waveguide system 110 may include structures to guide light/signals from each optical fiber coupled thereto, individually. PIC die 104 also includes a plurality of V-groove fiber optic receptacles 112 in a surface 114 thereof. As understood in the art, each V-groove fiber optic receptacle 112 is configured to receive an optical element 116 therein for alignment of optical element 116 with an input 118 of, e.g., optical waveguide system 110. As used herein, "optical element" may refer to a plurality of optical fibers 119, e.g., coupled in some way as an array, to be coupled to PIC die 104, or individual optical fibers 119. In some cases, optical element 116 includes a plurality of optical fibers 119, each individually placed in respective V-groove fiber optic receptacle 112. FIG. 2 shows an enlarged cross-sectional view of an optical element 116 in the form of a single optical fiber 119 in a respective V-groove fiber optic receptacle 112. As illustrated, V-groove fiber optic receptacles 112 are sized to mate with a particularly sized optical fiber 116. Ideally, a circularly cross-sectioned optical fiber 116 meets a respective V-groove fiber optic receptacle along two linear regions 120 (into and out of page), thus ensuring high precision alignment for coupling with input 118 (FIG. 1) to the optical waveguide system 110. While six V-groove fiber optic receptacles 112 are shown in FIG. 1, it is understood that any number of receptacles may be employed to receive any number of matching optical elements.

Figure 3:
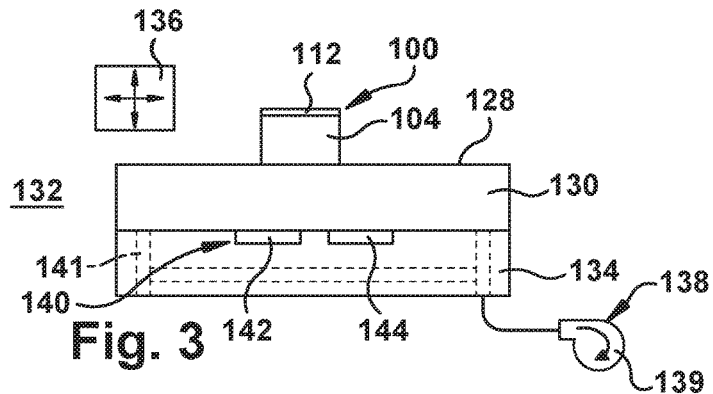
FIG. 3 shows a side view of a PIC die on a PIC die carrier and a base plate of a PIC package assembly tool, according to embodiments of the disclosure.

FIGS. 3-6 show side views of a method according to one embodiment of the disclosure. FIG. 3 shows PIC die 104 positioned on a PIC die carrier 130, i.e., on a first surface 128 of PIC die carrier 130. Initially, PIC die 104 may be mounted to PIC die carrier 130 using any now known or later developed material, e.g., an adhesive that may be thermally and electrically conductive, or non-conductive. PIC die carrier 130 may include any now known or later developed wafer handling material, e.g., a substrate(s) such as an organic laminate, glass, silicon, ceramic, etc. Embodiments of the disclosure will be described using PIC die carrier 130. It is emphasized that teachings of the disclosure are equally applicable to processes applied to a bare PIC die 104, i.e., without use of PIC die carrier 130.

PIC die 104 and PIC die carrier 130 are placed in a photonic integrated circuit (PIC) package assembly tool 132 (hereafter "assembly tool 132") including a base plate 134. Here, PIC die carrier 130 is placed on, e.g., mounted to, base plate 134. Assembly tool 132 may include any now known or later developed PIC package assembly tool including but not limited to, for example: an environmentally secure chamber (not shown), a pick- and place tool 136 (shown schematically), optical fiber 116 supply (not shown), adhesive dispense system (not shown), a UV cure system, and base plate 134 for supporting a PIC die 104 and PIC die carrier 130 during optical fiber 116 attach. Base plate 134 may include any now known or later developed mounting system for PIC die carrier 130. In the example shown, base plate 134 includes a vacuum system 138 configured to hold PIC die carrier 130 to base plate 134 using negative pressure. Vacuum system 138 may include any now known or later developed vacuum source 139, valves (not shown) and passages 141 through base plate 134 to transmit the negative pressure to an underside of PIC die carrier 130. In contrast to conventional base plates, base plate 134 of assembly tool 132 also includes a magnetic field generator 140 for generating a magnetic field. Magnetic field generator 140 may include any now known or later developed device for creating a magnetic field 180 (FIG. 5) through or about PIC die carrier 130 and PIC die 104 for purposes to be further described. Magnetic field generator 140 may include, for example, an electromagnet 142 for selectively generating the magnetic field, and/or a permanent magnet 144 (both shown in FIG. 3 only). The strength of the magnetic field 180 can vary, depending on the size and number of optical elements 116, and on the desired force to be applied to hold optical element 116 in place. Magnetic field generator 140 will be made to withstand the operational environment that it is exposed to. Where a permanent magnet 144 is employed, it may include, for example, neodymium or samarium-cobalt alloys, some of which retain their magnetic properties at temperatures greater than 250° C., which is useful for a subsequent thermal adhesive cure process.

Figure 4:
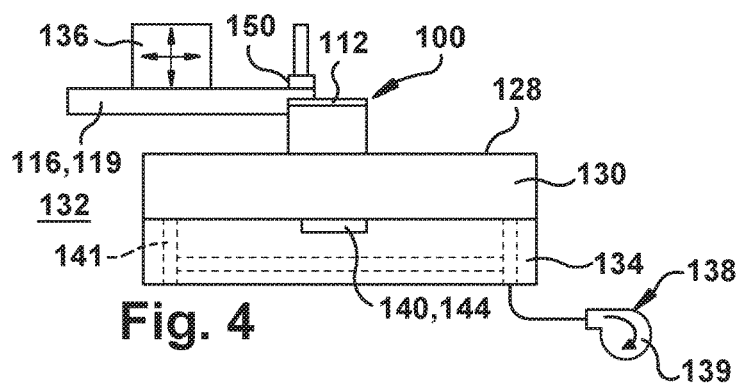
FIG. 4 shows a side view of a PIC die having an optical element positioned thereon and a magnetic force inducer over the optical element, according to embodiments of the disclosure.

FIG. 4 shows a side view of placing optical element 116 in V-groove fiber optic receptacle(s) 112 of PIC die 104. As noted, each V-groove fiber optic receptacle(s) 112 is configured to receive and operatively position optical element 116, e.g., an optical fiber, for optical coupling to PIC die 104. Optical element 116 may be placed in any now known or later developed fashion such as but not limited to use of a conventional pick-and-place tool 136, e.g., with a vacuum pick tip.

Figure 7:
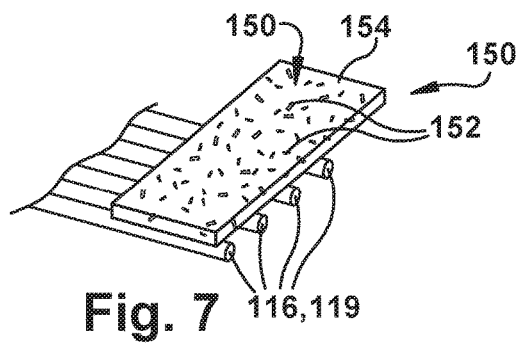
FIG. 7 shows a perspective view of one embodiment of a magnetic force inducer, according to the disclosure.

FIG. 4 also shows placing a magnetic force inducer (MFI) 150 over optical element 116. MFI 150 may be placed over optical element 116 as it is in position on PIC die 104, or MFI 150 may be placed on optical element 116 prior to placement thereof on PIC die 104. MFI 150 may be positioned using, for example, pick-and-place tool 136. MFI 150 may include any now known or later developed body or material having a high susceptibility to magnetization, the strength of which depends on that of an applied magnetic field. For example, MFI 150 may be made wholly or partly of a ferromagnetic material, e.g., iron, nickel, cobalt, rare earth metals, and combinations or alloys thereof. MFI 150 may be placed over optical element 116 in different manners depending on the form of MFI 150 employed. For example, MFI 150 may be placed on optical element 116, as shown in FIG. 7, by applying an epoxy 152 including magnetic force inducing material 154 therein over optical element 116, e.g., using an appropriate applicator 156. In other examples, as shown in FIG. 8A-8D, MFI 150 may be placed by placing one of a wire 160 (FIG. 8A), rod 162 (FIG. 8A, rigid wire), plate 164 (FIG. 8B), disk 165 (FIG. 8C), or patterned arrangement 166 (FIG. 8D, printed pattern) of a magnetic force inducing material over optical element 116. Each wire, rod, plate, disk, or patterned arrangement can be formed using any appropriate process, e.g., extrusion of rod or plate, stamping of plate or disk, printing of the patterned arrangement (freestanding or on a substrate). The patterned arrangement can have any form, shape, layout, pattern, etc., to create the desired magnetic force from magnetic field 180. Each of the structures shown in FIGS. 8A-D may be positioned by itself over optical element 116, or each may be embedded in another material such as glass or polymer matrix 167 (shown in phantom about each). In another example, shown in FIG. 9, MFI 150 placement may include placing a UV radiation transparent member 168, e.g., a glass or polymer block, including a magnetic force inducing (MFI) material 170 operatively coupled thereto over optical element 116. MFI material 170 may be in or on (above or below) UV radiation transparent member 168. In any event, MFI 150 does not block or very minimally blocks UV radiation from reaching optical element 116. Where MFI 150 includes a hard object, it may be placed in any known fashion, for example, by placement by pick-and-place tool 136. While particular MFI placement processes have been disclosed, embodiments of the disclosure may also employ any one or more of them, e.g., one may apply a ferromagnetic material including epoxy over any of the other MFI formats.

Figure 5:
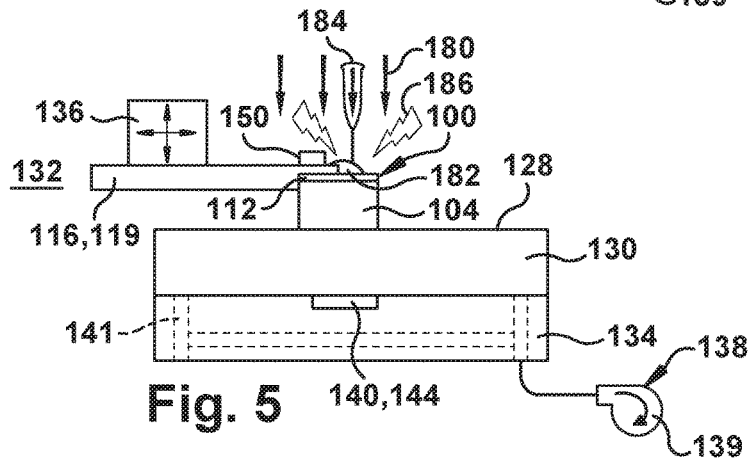
FIG. 5 shows a side view of a PIC die having the optical element adhered thereto under a magnetic force, according to embodiments of the disclosure.
Figure 10:
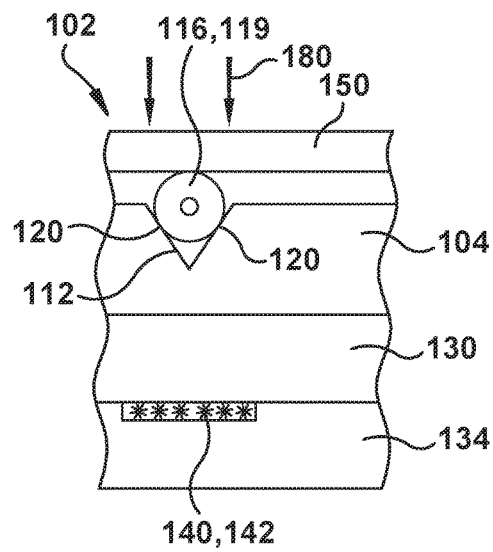
FIG. 10 shows an enlarged cross-sectional view of a PIC package with the MFI on a base plate of a PIC package assembly tool that includes a magnetic field generator, according to embodiments of the disclosure.
Figure 11:
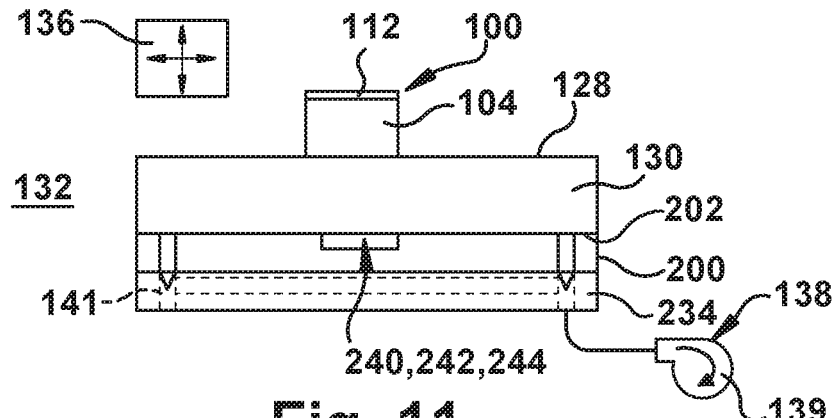
FIG. 11 shows a side view of a PIC die on a PIC die carrier, a sub-carrier member and base plate of a PIC package assembly tool, according to embodiments of the disclosure.

FIGS. 4 and 5 show a side view, and FIG. 10 shows an enlarged cross-sectional view, of generating a magnetic field 180, e.g., by activation of electromagnet 142 (FIGS. 3 and 10) where employed, or by permanent magnet 144 (FIGS. 4 and 5). Regardless of how formed, magnetic field 180 creates a magnetic force on MFI 150, forcing optical element 116 into position in V-groove fiber optic receptacle 112. As shown best in FIG. 10, magnetic field 180 ensures a circularly cross-sectioned optical element 116 meets a respective V-groove fiber optic receptacle 112 along two linear regions 120 (into and out of page), thus ensuring high alignment tolerance with input 118 (FIG. 1) of optical waveguide system 110 (FIG. 1).

With further regard to FIGS. 4 and 5, it is emphasized that in some alternative implementations, the acts noted may occur out of the order described. More particularly, in alternative embodiments, magnetic field 180 may be generated, e.g., by activation of electromagnet 142 (FIGS. 3 and 10) where employed, or by permanent magnet 144 (FIGS. 4 and 5), prior to placement of MFI 150 over optical element 116. That is, MFI 150 may be placed over optical element 116 with positioning and holding assistance of magnetic field 180.

Returning to FIG. 5, optical element 116 may be adhered to V-groove fiber optical receptacle 112 using an adhesive 182. This adhesion may be considered partial adhesion in that it merely tacks a part of optical element 116 in place, compared to a later step of providing permanent thermally-cured adhesion. In one embodiment, adhesive 182 includes any appropriate ultraviolet (UV) curable adhesive. In this case, the adhering may include applying adhesive 182, e.g., using any appropriate applicator 184, and applying UV radiation 186 to cure the adhesive. UV radiation 186 may be applied using any appropriate UV radiation source, e.g., typically 365-385 nanometer (nm) wavelength light.

After the curing (adhering) process, magnetic field 180 may be removed. Since optical element 116 is adhered, it will not move relative to PIC die 104. Where generating the magnetic field includes using an electromagnet 142 (FIGS. 3 and 10), magnetic field 180 may be removed after the adhesive curing (FIG. 5) by turning off the electromagnet. Alternatively, where generating the magnetic field includes using permanent magnet 144 (FIGS. 3-5) or an electromagnet 142 (FIGS. 3 and 10), magnetic field 180 may be removed after the adhesive curing (FIG. 5) by removing PIC die carrier 130 from base plate 134, e.g., releasing the vacuum and, where necessary, pulling the pieces apart to overcome the magnetic force of permanent magnet 144.

Figure 6:
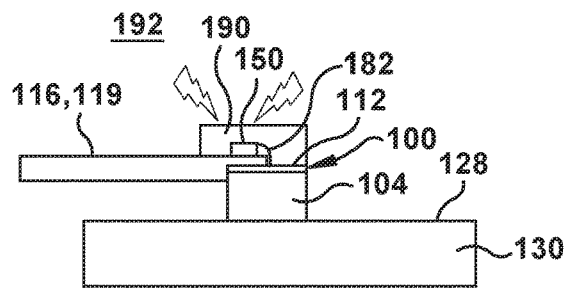
FIG. 6 shows a side view of a PIC die having the optical element permanently adhered, according to embodiments of the disclosure.
Figure 14:
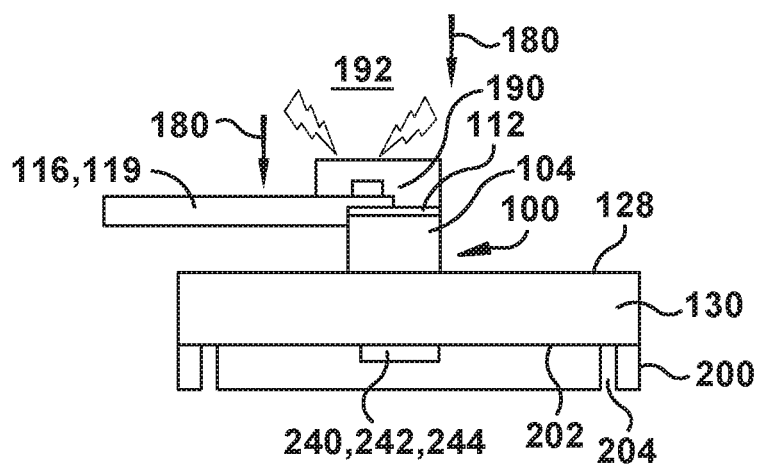
FIG. 14 shows a side view of a PIC die having the optical element permanently adhered and a PIC package with a sub-carrier member thereon, according to embodiments of the disclosure.
Figure 15:
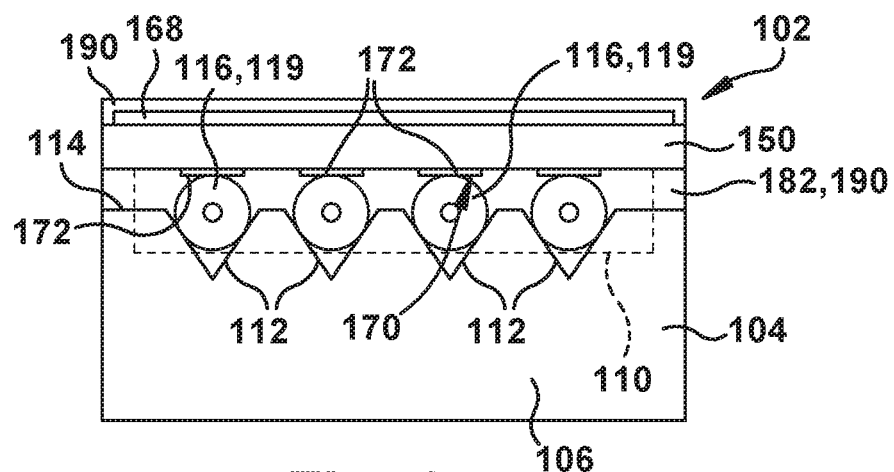
FIG. 15 shows a side view of a PIC package, according to embodiments of the disclosure.

FIG. 6 shows a side view of a subsequent step of permanently adhering optical element 116 to V-groove fiber optical receptacle 112 using a thermal cure process, using a second adhesive 190. Second adhesive 190 may include any now known or later developed: UV curable or UV cure, followed by thermal cure adhesive used for PIC packages 102 (FIGS. 14, 15). The heat to thermally cure second adhesive 190 can be provided by any now known or later developed thermal system 192, e.g., an annealing chamber, hot plate, etc.

Referring to FIGS. 11-14, in another embodiment of a method according to the disclosure, PIC die 104 and PIC die carrier 130 are placed in a PIC package assembly tool 132 including a base plate 234. Here, in contrast to FIGS. 3-5, PIC die carrier 130 is placed on, e.g., mounted to, a sub-carrier member 200 coupled to a second surface 202 of PIC die carrier 130 opposite first surface 128 thereof. Assembly tool 132 is identical to that described previously, except base plate 234 does not include magnetic field generator 140 (FIGS. 3-5). Rather, sub-carrier member 200 includes a magnetic field generator 240 configured to create magnetic field 180 (FIG. 13) that creates the magnetic force on MFI 150 against at least one of a plurality of optical fibers 119, i.e., of optical element 116. Magnetic field generator 240 may include, for example, an electromagnet 242 for selectively generating the magnetic field, and/or a permanent magnet 244 (only one shown). That is, sub-carrier member 200 includes magnetic field generator 240, e.g., one of an electromagnet 242 and a permanent magnet 244 for generating the magnetic field. Magnetic field generator 240 will be designed to be compatible with the operational environment that it is exposed to. Where a permanent magnet 244 is employed, it may include, for example, neodymium or samarium-cobalt alloys some of which are available for temperatures greater than 250° C. Sub-carrier member 200 is configured for selective mounting to base plate 234 of PIC package assembly tool 132. Base plate 234 may include any now known or later developed mounting system for sub-carrier member 200. In the example shown, base plate 234 includes vacuum system 138 configured to hold sub-carrier member 200 to base plate 234 using negative pressure. As noted, vacuum system 138 may include any now known or later developed vacuum source 139, valves (not shown) and passages 141 through base plate 234 to transmit the negative pressure to an underside of PIC die carrier 130. In this case, sub-carrier member 200 may include a number of passages 204 therein to allow the negative pressure to act on second surface 202 of PIC die carrier 130 and hold PIC die carrier 130 and sub-carrier member 200 to base plate 234. That is, passages 204 act as vacuum pressure pass-throughs that may mate with passages 141 in base plate 234. Passages 204 may extend from a lower surface to an upper surface of sub-carrier member 200, and may have any path necessary to deliver the vacuum where desired.

Figure 12:
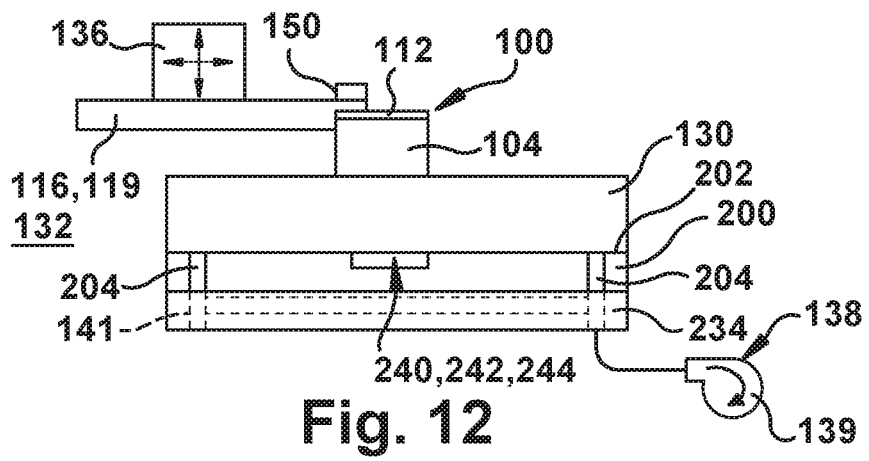
FIG. 12 shows a side view of a PIC die having an optical element positioned thereon with a magnetic force inducer, according to embodiments of the disclosure.

FIG. 12 shows a side view of placing optical element 116 in V-groove fiber optic receptacle(s) 112 of PIC die 104. As noted, each V-groove fiber optic receptacle(s) 112 is configured to receive and operatively position optical element 116, e.g., an optical fiber 119, for optical coupling to PIC die 104. Optical element 116 may be placed in any now known or later developed fashion such as but not limited to use of a conventional pick-and-place tool 136.

FIG. 12 also shows placing MFI 150 over optical element 116. MFI 150 may be placed over optical element 116 as it is in place on PIC die 104, or MFI 150 may be placed on optical element 116 prior to placement thereof on PIC die 104. MFI 150 may be placed and take any form, as previously described herein.

Figure 13:
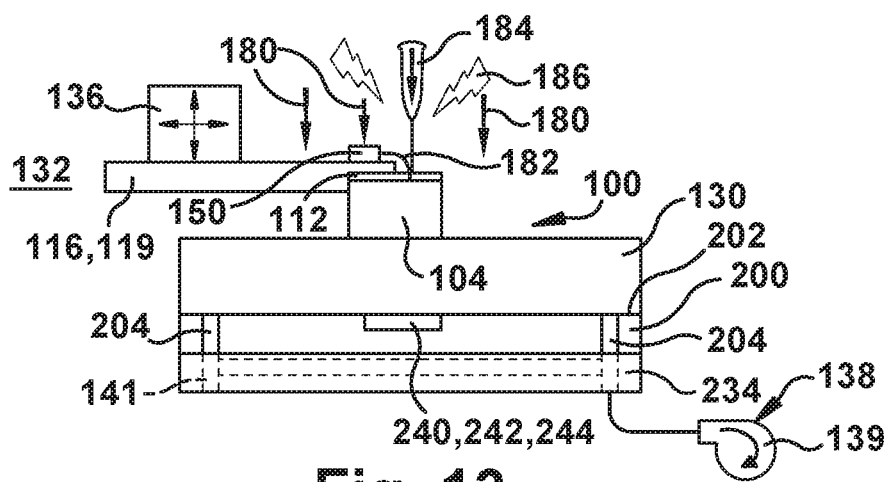
FIG. 13 shows a side view of a PIC die having the optical element adhered thereto under a magnetic force, according to embodiments of the disclosure.

FIG. 13 shows a side view of generating magnetic field 180, e.g., by activation of electromagnet 242 where employed, or by permanent magnet 244. Regardless of how formed, magnetic field 180 creates a magnetic force on MFI 150, forcing optical element 116 into position in V-groove fiber optic receptacle 112. Again, as shown best in FIG. 10, magnetic field 180 ensures a circularly cross-sectioned optical element 116 meets a respective V-groove fiber optic receptacle 112 along two linear regions 120 (into and out of page), thus ensuring high alignment precision with input 118 (FIG. 1) of optical waveguide system 110 (FIG. 1). Returning to FIG. 13, optical element 116 may be adhered to V-groove fiber optical receptacle 112 using adhesive 182. This adhesion is substantially similar to that described relative to FIG. 5.

With further regard to FIGS. 12 and 13, it is emphasized that in some alternative implementations, the acts noted may occur out of the order described. More particularly, in alternative embodiments, magnetic field 180 may be generated, e.g., by activation of electromagnet 242 where employed, or by permanent magnet 244, prior to placement of MFI 150 over optical element 116 (FIG. 12). That is, MFI 150 may be placed over optical element 116 with positioning and holding assistance of magnetic field 180.

As shown in FIG. 14, after the adhering (FIG. 13), sub-carrier member 200 with PIC die carrier 130, PIC die 104 and optical element 116 can be removed from base plate 234. Here, magnetic field 180 may be maintained during movement of PIC die carrier 130 with PIC die 104 thereon outside of PIC package assembly tool 132. That is, magnetic field 180 may be maintained by magnetic field generator 140, allowing PIC die 104 with optical element 116 adhered thereto to be moved to any desired location with the additional security of magnetic field 180 retaining optical element 116 in V-groove fiber optic receptacle(s) 112. PIC die 104 with optical element 116 can be moved to any desired location. For example, as shown in FIG. 14, they may be moved to thermal system 192, e.g., an annealing chamber, for permanently adhering optical element 116 to V-groove fiber optical receptacle 112 using thermally cured adhesive 190. As noted, thermally cured adhesive 190 may include any now known or later developed thermal adhesive used for PIC packages 102 (FIG. 15). Magnetic field 180 may be removed thereafter at any desired time. Where generating the magnetic field includes using an electromagnet 242, magnetic field 180 may be removed by turning off the electromagnet. Alternatively, where generating the magnetic field includes using permanent magnet 244, magnetic field 180 may be removed by removing sub-carrier element 200 from PIC die carrier 130, e.g., by force sufficient to overcome the magnetic force.

While embodiments of the disclosure have been described using PIC die carrier 130, it will be appreciated that teachings of the disclosure are equally applicable to processes applied to a bare PIC die 104, i.e., without use of PIC die carrier 130. In this environment, optical elements, like optical fiber stubs, can be attached to a bare PIC die 104 having copper pillars or solder bumps enabling subsequent flip-chip attach to laminates without complications of viewing V-groove fiber optic receptacles for fiber alignment and adhesive curing. It will be understood that base plate 134 or sub-carrier member 200 would, in this environment, be re-sized to attach directly to a bare PIC die 104.

Referring to the cross-sectional view of FIG. 15, PIC package 102 according to embodiments of the disclosure may include PIC die 104. As noted, PIC die 104 includes electro-optical circuitry 106 having optical waveguide system 110 therein. PIC die 104 also includes V-groove fiber optic receptacle(s) 112 on first surface 114 thereof. V-groove fiber optic receptacle(s) 112 position optical element 116 for optical coupling with optical waveguide system 110. Optical element 116 is operatively coupled to optical waveguide system 110 (FIG. 1) and positioned in V-groove fiber optic receptacle 112. Optical element 116 may include a plurality of optical fibers 119 (individually separated or somehow coupled as an array), with each fiber positioned in a respective one a plurality of V-groove fiber optic receptacles 112 on first surface 114 of PIC die 104 for operative coupling to optical waveguide system 110 (FIG. 1).

Figure 8A:
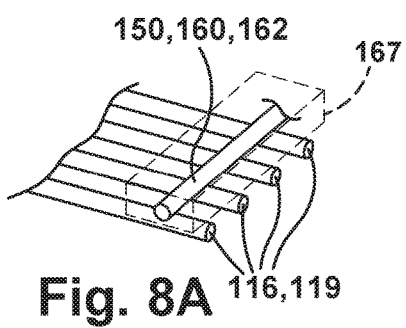
FIGS. 8A-D each show a perspective view of a different embodiment of a magnetic force inducer, according to the disclosure.
Figure 8B:
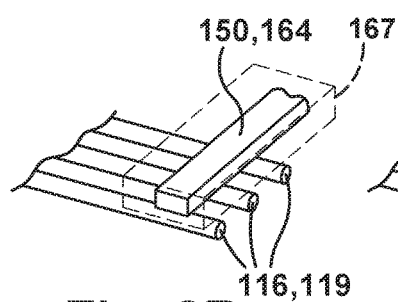
Figure 8C:
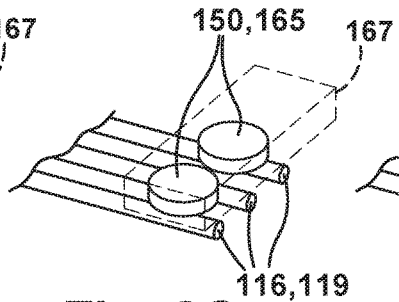
Figure 8D:
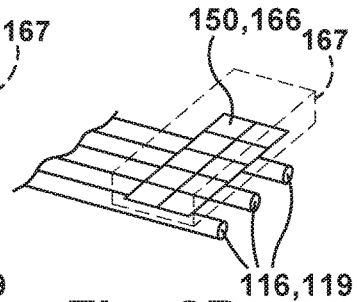
Figure 9:
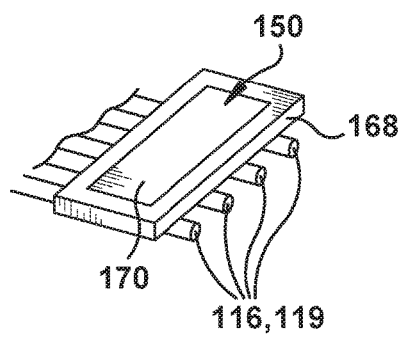
FIG. 9 shows a perspective view of another embodiment of a magnetic force inducer, according to the disclosure.

In contrast to conventional PIC packages, PIC package 102 includes MFI 150 positioned over optical element 116. That is, after assembly, MFI 150 may remain part of PIC package 102. Alternatively, in another embodiment (not shown), MFI 150, if it is not adhered to PIC die 104 by adhesive 182, may be removed and reused. In any event, during assembly, MFI 150 forcibly directs optical element 116 into position in V-groove fiber optic receptacle 112 in response to application of magnetic field 180 (FIGS. 5 and 13) from a direction opposite the V-groove fiber optic receptacle in first surface 114. Magnetic field 180 is applied during assembly of optical element 116, and may be retained after adhering of optical element 116 (FIG. 13-14) where sub-carrier member 200 is employed. As described, MFI 150 may take a variety of forms. As shown in FIG. 7, MFI 150 may include magnetic force inducing material 152 embedded in a UV transparent polymer film 154. As shown in FIG. 9, MFI 150 may include UV radiation transparent member 168, e.g., a glass or polymer block, including a magnetic force inducing material 170 operatively coupled thereto. That is, MFI material 170 is either in UV radiation transparent member 168, and/or on UV radiation transparent member 168 (any outside surface(s)). As shown in FIG. 15, in one embodiment, UV radiation transparent member 168 may further include a protrusion 172 for engaging optical element 116 in V-groove fiber optic receptacle 112, i.e., to engage an upper surface of optical element 116 to apply force thereto, for example, above a respective receptacle 112. Any number of protrusions 172 may be employed. As shown in FIGS. 8A-D, MFI 150 material may have a shape of at least one of: wire 160 (FIG. 8A), rod 162 (FIG. 8B, hard wire), plate 164 (FIG. 8B), disk (FIG. 8C), or patterned arrangement 166 (FIG. 8D). The patterned arrangement can have any form, shape, layout, pattern, etc., to create the desired magnetic force from magnetic field 180. As noted, MFI 150 may include a ferromagnetic material. PIC package 102 may also include an adhesive 190 coupling optical element 116 to PIC die 104.

As shown in FIG. 14, in one embodiment, during movement of PIC package 102, it may further include PIC die carrier 130 coupled to second surface 200 of PIC die 104 opposite the first surface 128, and sub-carrier member 200 coupled to PIC die carrier 130. Sub-carrier member 200 is coupled to a second surface 202 (FIG. 14) of PIC die carrier 130 opposite first surface 128 thereof (or just directly to PIC die 104 if PIC die carrier 130 is not used). Sub-carrier member 200 may include magnetic field generator 240 configured to create magnetic field 180 that creates a magnetic force on MFI 150 against optical element 116, e.g., at least one of plurality of optical fibers 119, in V-groove fiber optic receptacle 112. MFI 150 is positioned on at least one of plurality of optical fibers 119 to forcibly direct at least one of the plurality of optical fibers 119 into position in a respective V-groove fiber optic receptacle 112 in response to application of magnetic field 180 from a direction opposite V-groove fiber optic receptacles 112 in first surface 114. In this fashion, PIC package 102 can be moved with adhesive 182 holding optical fiber(s) 119 in place, and with the added security of MFI 150 and magnetic field generator 240 in sub-carrier member 200 holding optical fiber(s) 119 in place.

It will be recognized that the teachings of the disclosure are also applicable for alternate applications in which optical elements are placed, e.g., optical fibers to polymer waveguides, laser dies in PIC die cavities, individual optical fibers and fiber ribbons in V-groove fiber optic receptacles, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A photonic integrated circuit (PIC) package, comprising:
    a PIC die, the PIC die including electro-optical circuitry having an optical waveguide system therein and a V-groove fiber optic receptacle on a first surface thereof;
    a movable PIC die carrier coupled to a second surface of the PIC die opposite the first surface;
    an optical element operatively coupled to the optical waveguide system and positioned in the V-groove fiber optic receptacle;
    a sub-carrier member coupled to the PIC die carrier, the sub-carrier member including a magnetic field generator that produces a magnetic field; and
    a magnetic force inducer (MFI) positioned over the optical element including an ultraviolet (UV) transparent member including a magnetic force inducing material embedded in a UV transparent polymer film, wherein the magnetic field produces magnetic force on the MFI against the optical element in the V-groove fiber optic receptacle during movement of the PIC die carrier with the PIC die thereon.

2. The PIC package of claim 1, wherein the MFI material is in the UV radiation transparent member, or on the UV radiation transparent member.

3. The PIC package of claim 1, wherein the MFI material has a shape of at least one of: a wire, rod, plate, disk or patterned arrangement.

4. The PIC package of claim 1, wherein the UV radiation transparent member further includes a protrusion for engaging the optical element in the V-groove fiber optic receptacle.

5. The PIC package of claim 1, wherein the MFI includes an MFI material having a shape of at least one of: a wire, rod, plate, disk, or patterned arrangement.

6. The PIC package of claim 1, wherein the MFI includes a ferromagnetic material.

7. The PIC package of claim 1, further comprising an adhesive coupling the optical element to the PIC die.

8. The PIC package of claim 1, wherein the optical element includes a plurality of optical fibers in an array positioned in a plurality of V-groove fiber optic receptacles on the first surface of the PIC die.

9. A photonic integrated circuit (PIC) package, comprising:
a PIC die mounted to a first surface of a PIC die carrier, the PIC die including electro-optical circuitry having an optical waveguide system therein and a plurality of V-groove fiber optic receptacles on a first surface thereof;
a plurality of optical fibers, each optical fiber positioned in one of the plurality of V-groove fiber optic receptacles;
a magnetic force inducer (MFI) positioned on at least one of the plurality of optical fibers to forcibly direct at least one of the plurality of optical fibers into position in a respective V-groove fiber optic receptacle in response to application of a magnetic field from a direction opposite the V-groove fiber optic receptacles in the first surface, wherein the MFI includes an ultraviolet (UV) transparent member including a magnetic force inducing material embedded in a UV transparent polymer film; and
a sub-carrier member coupled to a second surface of the PIC die carrier opposite the first surface thereof, the sub-carrier member including a magnetic field generator configured to create the magnetic field that creates the magnetic force on the MFI against the at least one of the plurality of optical fibers,
wherein the magnetic field produces magnetic force on the MFI against the plurality of optical fibers in the V-groove fiber optic receptacles during movement of the sub-carrier member with the PIC die thereon.

10. A method, comprising:
mounting a photo integrated circuit (PIC) die to a PIC die carrier;
placing an optical element in a V-groove fiber optic receptacle of the PIC die, the V-groove fiber optic receptacle configured to receive and operatively position the optical element for optical coupling to the PIC die;
placing a magnetic force inducer (MFI) over the optical element;
generating a magnetic field, the magnetic field creating a magnetic force on the MFI, forcing the optical element into position in the V-groove fiber optic receptacle, wherein generating the magnetic field includes placing the PIC die carrier on a sub-carrier member configured for selective mounting to a base plate of a photonic integrated circuit (PIC) package assembly tool, the sub-carrier member including a magnetic field generator for generating the magnetic field;
adhering the optical element to the V-groove fiber optical receptacle using an adhesive; and
maintaining the magnetic field during movement of the PIC die carrier with the PIC die thereon outside of the PIC package assembly tool.

11. The method of claim 10, wherein the generating the magnetic field includes using an electromagnet, and further comprising removing the magnetic field after the adhering.

12. The method of claim 10, wherein the adhesive includes an ultraviolet (UV) curable adhesive, and wherein the adhering includes applying the adhesive and applying UV radiation to cure the adhesive.

13. The method of claim 10, further comprising, prior to the placing the optical element in a V-groove fiber optic receptacle of the PIC die, mounting the PIC die to a PIC die carrier, and wherein the generating the magnetic field includes:
placing the PIC die carrier on a base plate of a photonic integrated circuit (PIC) package assembly tool, the base plate including a magnetic field generator for generating the magnetic field.

14. The method of claim 10, further comprising permanently adhering the optical element to the V-groove fiber optical receptacle using a thermally cured adhesive.

15. The method of claim 10, wherein the placing the MFI over the optical element includes at least one of:
applying an epoxy including magnetic force inducing material therein over the optical element;
placing one of a wire, rod, plate, disk, or patterned arrangement of a magnetic force inducing material over the optical element; and
placing an ultraviolet (UV) radiation transparent member including a magnetic force generating (MFI) element operatively coupled thereto over the optical element.

* * * * *